(12) United States Patent
Collie et al.

(10) Patent No.: US 6,167,915 B1
(45) Date of Patent: Jan. 2, 2001

(54) WELL PUMP ELECTRICAL CABLE WITH INTERNAL BRISTLE SUPPORT

(75) Inventors: Charles C. Collie, Tulsa; Phillip R. Wilbourn, Claremore, both of OK (US)

(73) Assignee: Baker Hughes Inc., Houston, TX (US)

( * ) Notice: Under 35 U.S.C. 154(b), the term of this patent shall be extended for 0 days.

(21) Appl. No.: 09/385,339

(22) Filed: Aug. 30, 1999

(51) Int. Cl.$^7$ .................................................. F16L 55/00
(52) U.S. Cl. ........................ 138/114; 138/108; 138/113; 166/241.1
(58) Field of Search .................................. 138/108, 112, 138/113, 131, 135; 166/241.1, 385; 174/72 A, 72 TR, 104, 135, 168

(56) References Cited

U.S. PATENT DOCUMENTS

| | | | |
|---|---|---|---|
| H1232 | 9/1993 | DiSiena | 166/385 X |
| 1,935,999 | 11/1933 | Tessky | 138/108 |
| 2,779,915 | 1/1957 | Moon | 324/10 |
| 3,758,701 | * 9/1973 | Schmidt | 138/113 X |
| 4,004,888 | * 1/1977 | Musall et al. | 138/108 X |
| 4,346,256 | 8/1982 | Hubbard | 174/47 |
| 4,456,058 | * 6/1984 | Powell | 138/112 X |
| 5,145,007 | * 9/1992 | Dinkins | 166/386 |
| 5,191,173 | 3/1993 | Sizer et al. | 174/105 R |
| 5,269,377 | * 12/1993 | Martin | 166/385 |
| 5,435,351 | 7/1995 | Head | 138/111 |
| 5,821,452 | 10/1998 | Neuroth et al. | 174/28 |
| 5,845,709 | 12/1998 | Mack et al. | 166/302 |
| 5,992,468 | * 11/1999 | Dwiggins | 138/108 |

* cited by examiner

*Primary Examiner*—Patrick Brinson
(74) *Attorney, Agent, or Firm*—Felsman, Bradley, Vaden, Gunter & Dillon, L.L.P.; James E. Bradley

(57) ABSTRACT

An electrical cable has helically attached bristles for supporting the electrical cable when pulled through a string of coiled tubing to connect to an electrical submersible pump. The electrical cable and helically attached bristles have a circumscribed diameter greater than the inner diameter of the coiled tubing. The bristles deflect in a direction opposite the direction of pulling the electrical cable so that they grip the wall of the coiled tubing. The bristles apply a resistive frictional force to the wall of the coiled tubing, thereby transferring the weight of the electrical cable to the coiled tubing.

11 Claims, 3 Drawing Sheets

WELL PUMP ELECTRICAL CABLE WITH INTERNAL BRISTLE SUPPORT

TECHNICAL FIELD

This invention relates to an electrical cable encased in coiled tubing for use with an electrical submersible well pump. In particular, this invention relates to a support system involving bristles attached to the electrical cable wherein the bristles act as a support mechanism for the weight of the electrical cable.

BACKGROUND ART

Electrical submersible well pumps are widely used in industry to pump oil from deep within the earth. The electrical pump receives its power via an electrical cable that runs from the surface to an AC motor placed directly below or above the pump. Because of the depth of the well, the electrical cable oftentimes cannot support its own weight. In conventional installations, the cable is strapped to production tubing that supports the pump. A recent type of installation supports the pump on a continuous string of coiled tubing. The cable extends through the coiled tubing. Various proposals have been made to support the electrical cable within the coiled tubing, thereby transferring the weight of the electrical cable to the walls of the coiled tubing.

U.S. Pat. No. 5,191,173, Sizer et al., Mar. 2, 1993, describes an electrical cable assembly wherein the electrical cable is encased in longitudinally welded reeled tubing. This proposal consists of mechanically or chemically bonding an electrical cable core to reeled tubing so as to prevent longitudinal or axial movement of the electrical cable as well as to transfer the weight of the electrical cable to the reeled tubing.

U.S. Pat. No. 5,435,351, Head, Jul. 25, 1995, proposes the use of a plurality of anchors attached to a conduit. The anchors can be activated to engage the wall of the coiled tubing and subsequently deactivated to disengage themselves from the wall of the coiled tubing.

Another proposal shown in U.S. Pat. No. 5,821,452, Neuroth et al., Oct. 13, 1998, utilizes clamped elastomeric supports to grip the electrical cable to the wall of the coiled tubing. The electrical cable is inserted into the coiled tubing with the supports already attached to the electrical cable. Hydrocarbon fluid is then pumped through the coiled tubing causing the elastomeric supports to swell and effectively grip the walls of the coiled tubing.

DISCLOSURE OF INVENTION

This invention consists of an electrical cable encased within coiled tubing where the cable extends to an AC motor used to power an electrical submersible pump. The power is supplied to the AC motor through insulated electrical conductors embedded within the electrical cable. Bristles are attached to the electrical cable before the electrical cable is pulled through the coiled tubing. The circumscribed diameter of the bristles and the electrical cable is greater than the inner diameter of the coiled tubing so that when the electrical cable is pulled through the coiled tubing, the bristles are deflected in a direction opposite the direction of pulling. The bristles are able to "grip" the inside wall of the coiled tubing, thereby transferring the weight of the electrical cable to the coiled tubing and creating suspension of the electrical cable within the coiled tubing. This invention allows the electrical cable to be pulled out of the coiled tubing by pulling it the same way it was pulled into the coiled tubing.

The preferred embodiment of this invention is to have the bristles extend the entire length of the electrical cable to provide continuous and uninterrupted support. The bristles can be attached either helically or in rows parallel to the axis along the electrical cable.

Another embodiment of this invention is to have the bristles support the electrical cable in intervals wherein the electrical cable would have supported and unsupported sections. Again, the bristles could either be attached helically or parallel to the axis to the electrical cable in this alternate embodiment.

BEST MODE FOR CARRYING OUT THE INVENTION

Figure 1:
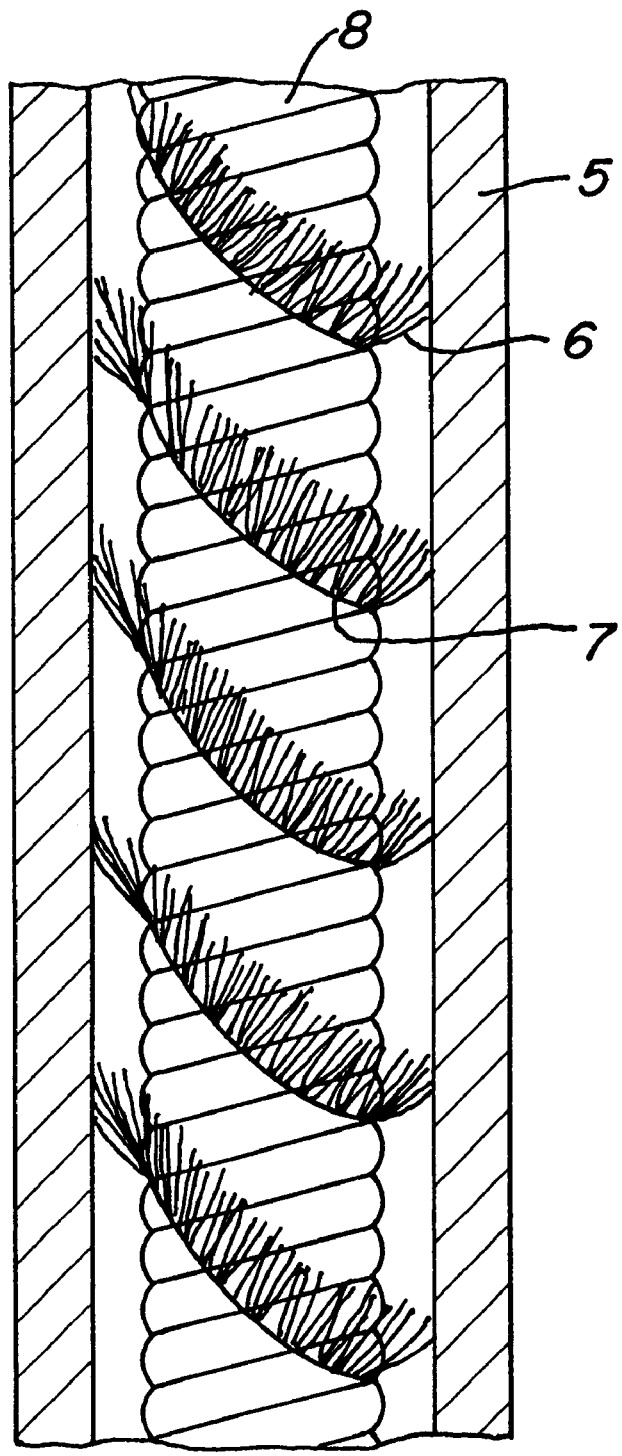
FIG. 1 is a vertical side view of the electrical cable located within the coiled tubing with the bristles attached helically to the wall of the electrical cable.
Figure 3:
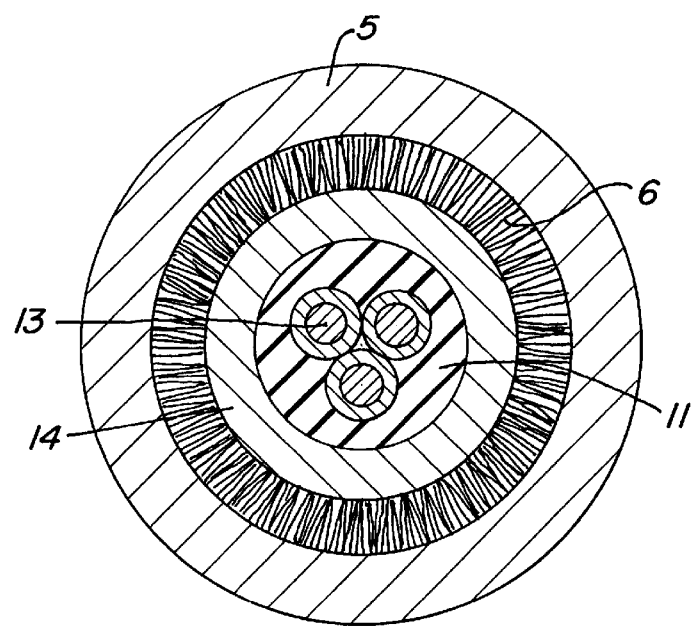
FIG. 3 is a cross-sectional top view of the electrical cable with the bristles attached to the wall of the electrical cable.

Referring to FIG. 1, an electrical cable for a submersible pump includes a string of continuous coiled tubing 5. Coiled tubing 5 is capable of being wound on a large reel for transport to a well site, then forced into the well. An electrical cable 8 is shown inserted through the length of coiled tubing 5. Electrical cable 8 is of a type particularly for supplying AC power from the surface to a downhole motor for driving a centrifugal pump, which is located at the lower end of coiled tubing 5. As shown in FIG. 3, electrical cable 8 has three insulated conductors 13. Jacket 11 has a cylindrical exterior and is composed of a material such as Nitrile rubber. Armor 14 comprising a steel strip is helically wrapped around jacket 11 in a conventional manner.

Figure 2:
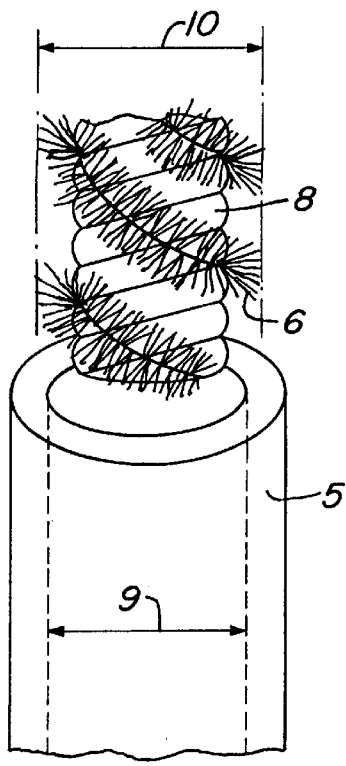
FIG. 2 is a side view of the coiled tubing, the electrical cable, and the bristles and prior to insertion of the electrical cable into the coiled tubing.
Figure 4:
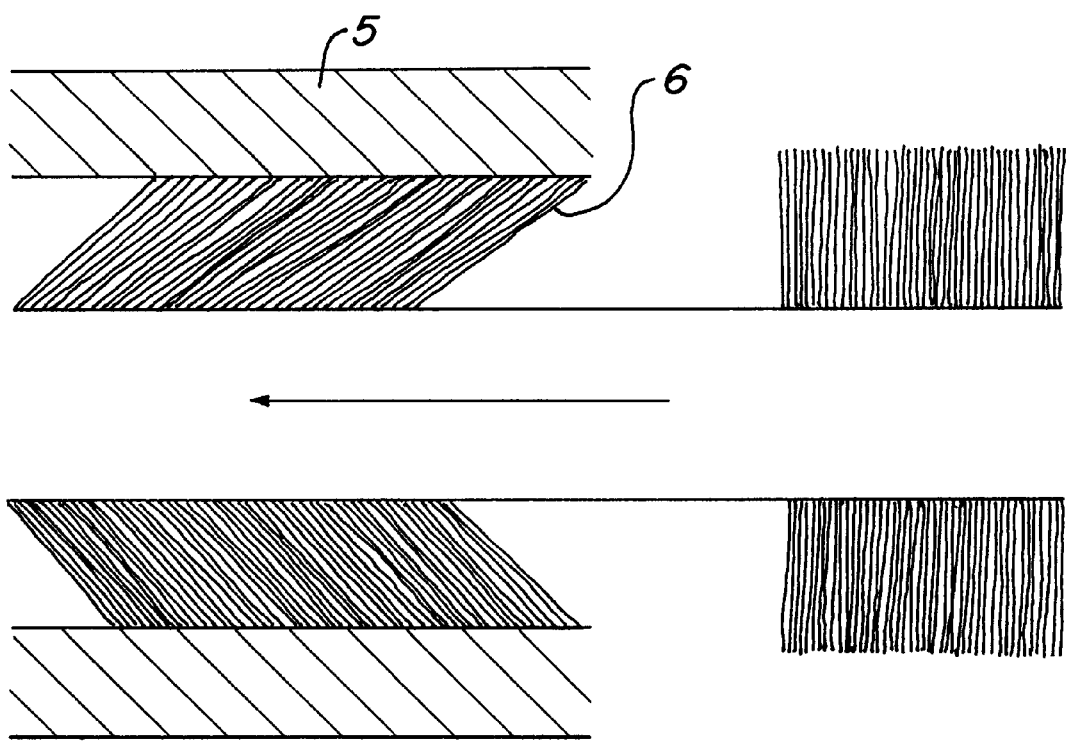
FIG. 4 is a horizontal side view of the electrical cable wherein the electrical cable is partly located within the coiled tubing and wherein the bristles are attached to the wall of the electrical cable in intervals of supported and unsupported sections.
Figure 1:
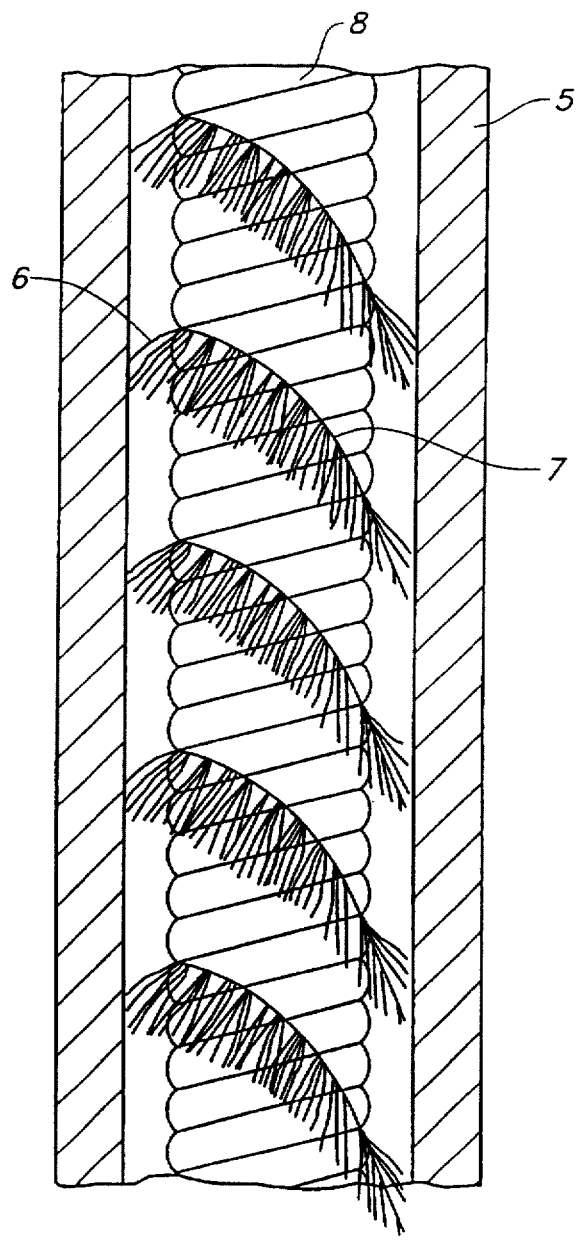

Referring to FIGS. 1 and 2, the preferred embodiment has a row of bristles 6 helically attached to and running the entire length of the electrical cable 8. Referring to FIG. 4, an alternative embodiment has a row of helical bristle supported sections at intervals along the electrical cable 8 with unsupported sections between them. Bristles 6 are short resilient fibers protruding from a backing strip 7, which may be a wire. Bristles 6 need not be parallel to each other. The bristles 6 can be composed of a variety of materials and can be attached to the electrical cable 8 by a variety of adhesives. Once attached, bristles 6 protrude generally in a radial outward direction from cable 8.

Referring to FIG. 1, the electrical cable 8 may be pulled into the coiled tubing 5 with a rigid wire, thereby causing the bristles 6 to deflect in a direction opposite movement. This allows for simple removal of the electrical cable 8, whereby direction of removal is the same direction as insertion. Referring to FIG. 2, the circumscribed diameter 10 of the bristles 6 when attached to the electrical cable 8 is larger than the inside diameter of the coiled tubing 9. This allows the bristles 6 to "grip" the wall of the coiled tubing 5 when the electrical cable 8 is inserted into the coiled tubing 5. By gripping the coiled tubing 5, the attached bristles 6 create a frictional force between the bristles 6 and the wall of the coiled tubing 5. The weight of the electrical cable 7 creates a downward force on the electrical cable 7, but this force is counteracted by the resistive frictional force. Thus, the frictional force effectively transfers the weight of the electrical cable 8 to the wall of the coiled tubing 5, thereby preventing the electrical cable 8 from parting under its own weight.

The invention has advantages. The bristles can provide support along the entire length of the electrical cable rather than in mere intervals. Another advantage of this invention is that distortion of the coiled tubing during bending does not weaken the bristle support system because the bristles can deflect to accommodate this distortion. Also, the bristle support mechanism can function properly even when interacting with irregularities such as a weld seam inside the tubing. The bristles can cushion the electrical cable from external shock during shipping and handling. The design of attaching bristles to an electrical cable can be achieved rather cheaply compared to the other more complex designs proposed. Also, the electrical cable can be removed from the coiled tubing rather easily, which allows for maintenance to be performed at minimal cost. Removal is not possible with some of the proposed designs.

While the invention has been shown in only two of its forms, it should be apparent to those skilled in the art that it is not so claimed, but is susceptible to various changes without departing from the scope of the invention. For example, although both embodiments show a helical row of bristles, axial rows of bristles parallel to the cable axis could also be used.

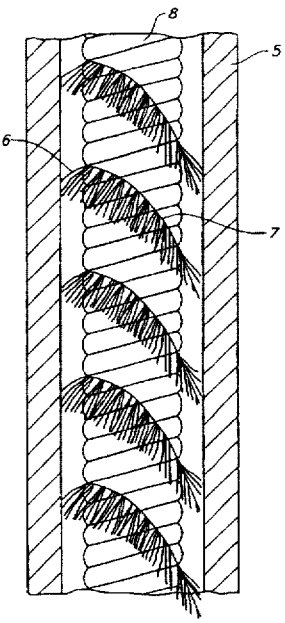

What is claimed is:

1. A support and power supply system for an electrical submersible well pump, comprising:

a string of coiled tubing;

an electrical cable having a plurality of insulated electrical conductors for supplying power to the pump;

bristles attached along a length of the electrical cable so that a frictional force is applied between the bristles and the coiled tubing, thereby supporting the electrical cable by transferring weight of the electrical cable to the coiled tubing; and wherein the bristles extend continuously without interruption along the cable.

2. The system according to claim 1 wherein the inner diameter of the coiled tubing is less than a circumscribed diameter of the bristles attached to the electrical cable.

3. The system according to claim 1 wherein the bristles extend in a row.

4. A support and power supply system for an electrical submersible well pump, comprising:

a string of coiled tubing;

an electrical cable having a plurality of insulated electrical conductors for supplying power to the pump;

bristles attached along a length of the electrical cable so that a frictional force is applied between the bristles and the coiled tubing, thereby supporting the electrical cable by transferring weight of the electrical cable to the coiled tubing; and wherein the bristles extend in a row helically wrapped around the cable.

5. The system according to claim 4 wherein the bristles are contained in a plurality of support sections that are separated by unsupported sections of the cable that are free of the bristles.

6. An apparatus for supplying power to an electrical submersible pump suspended in a well on a string of coiled tubing, comprising:

an electrical cable having a plurality of insulated electrical conductors for supplying power to the electrical submersible pump;

a row of bristles attached in intervals along a length of the electrical cable, the cable and row of bristles adapted to be inserted into the coiled tubing so that a frictional force will be applied between the bristles and the coiled tubing, thereby supporting the electrical cable by transferring weight of the cable to the coiled tubing; and wherein the bristles extend in a row helically wrapped around the cable.

7. The apparatus according to claim 6 wherein the bristles are contained in a plurality of support sections that are separated by unsupported sections of the cable that are free of the bristles.

8. A method for supporting the weight of an electrical cable extending vertically through a string of coiled tubing for the powering of a submersible pump, the improvement comprising:

attaching bristles to the electrical cable;

then inserting the cable into the coiled tubing, causing the bristles to deflect against an internal wall to support the weight of the cable; and wherein the step of attaching bristles comprises attaching the bristles in a row wrapped helically along a length of the cable.

9. A method for supporting the weight of an electrical cable extending vertically through a string of coiled tubing for the powering of a submersible pump, the improvement comprising:

attaching bristles to the electrical cable;

then inserting the cable into the coiled tubing, causing the bristles to deflect against an internal wall to support the weight of the cable; and wherein the step of attaching bristles comprises attaching the bristles continuously along an entire length of the cable without interruption.

10. The method according to claim 8 wherein the step of attaching bristles comprises attaching bristles in support sections along the cable, the support sections being interrupted by unsupported sections free of the bristles.

11. The method according to claim 8, further comprising removing the cable from the coiled tubing by pulling it in the same direction relative to the coiled tubing as it was inserted.

* * * * *

UNITED STATES PATENT AND TRADEMARK OFFICE
CERTIFICATE OF CORRECTION

PATENT NO. : 6,167,915 B1
DATED : January 2, 2001
INVENTOR(S) : Charles C. Collie et al.

It is certified that error appears in the above-identified patent and that said Letters Patent is hereby corrected as shown below:

The title page should be deleted to appear as per attached title page.

The sheet of drawing consisting of figure 1, should be deleted to appear as per attached sheet.

Signed and Sealed this

Twelfth Day of March, 2002

Attest:

Attesting Officer

JAMES E. ROGAN
Director of the United States Patent and Trademark Office

(12) United States Patent
Collie et al.

(10) Patent No.: US 6,167,915 B1
(45) Date of Patent: Jan. 2, 2001

(54) WELL PUMP ELECTRICAL CABLE WITH INTERNAL BRISTLE SUPPORT

(75) Inventors: Charles C. Collie, Tulsa; Phillip R. Wilbourn, Claremore, both of OK (US)

(73) Assignee: Baker Hughes Inc., Houston, TX (US)

(*) Notice: Under 35 U.S.C. 154(b), the term of this patent shall be extended for 0 days.

(21) Appl. No.: 09/385,339

(22) Filed: Aug. 30, 1999

(51) Int. Cl.$^7$ ............................................. F16L 55/00
(52) U.S. Cl. ........................... 138/114; 138/108; 138/113; 166/241.1
(58) Field of Search .......................... 138/108, 112, 138/113, 131, 135; 166/241.1, 385; 174/72 A, 72 TR, 104, 135, 168

(56) References Cited

U.S. PATENT DOCUMENTS

| | | | |
|---|---|---|---|
| H1232 | 9/1993 | DiSiena | 166/385 X |
| 1,935,999 | 11/1933 | Tessky | 138/108 |
| 2,779,915 | 1/1957 | Moon | 324/10 |
| 3,758,701 * | 9/1973 | Schmidt | 138/113 X |
| 4,004,888 * | 1/1977 | Musall et al. | 138/108 X |
| 4,346,256 | 8/1982 | Hubbard | 174/47 |
| 4,456,058 * | 6/1984 | Powell | 138/112 X |
| 5,145,007 * | 9/1992 | Dinkins | 166/386 |
| 5,191,173 | 3/1993 | Sizer et al. | 174/105 R |
| 5,269,377 * | 12/1993 | Martin | 166/385 |
| 5,435,351 | 7/1995 | Head | 138/111 |
| 5,821,452 | 10/1998 | Neuroth et al. | 174/28 |
| 5,845,709 | 12/1998 | Mack et al. | 166/302 |
| 5,992,468 * | 11/1999 | Dwiggins | 138/108 |

* cited by examiner

*Primary Examiner*—Patrick Brinson
(74) *Attorney, Agent, or Firm*—Felsman, Bradley, Vaden, Gunter & Dillon, L.L.P.; James E. Bradley

(57) ABSTRACT

An electrical cable has helically attached bristles for supporting the electrical cable when pulled through a string of coiled tubing to connect to an electrical submersible pump. The electrical cable and helically attached bristles have a circumscribed diameter greater than the inner diameter of the coiled tubing. The bristles deflect in a direction opposite the direction of pulling the electrical cable so that they grip the wall of the coiled tubing. The bristles apply a resistive frictional force to the wall of the coiled tubing, thereby transferring the weight of the electrical cable to the coiled tubing.

11 Claims, 3 Drawing Sheets